(12) United States Patent
Song et al.

(10) Patent No.: US 8,412,835 B2
(45) Date of Patent: Apr. 2, 2013

(54) METHOD FOR SUPPORTING SESSION MOBILITY

(75) Inventors: Jae-Seung Song, Gyeonggi-do (KR); Hyun-Sook Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/667,454

(22) PCT Filed: Jul. 3, 2008

(86) PCT No.: PCT/KR2008/003933
§ 371 (c)(1),
(2), (4) Date: Dec. 31, 2009

(87) PCT Pub. No.: WO2009/005316
PCT Pub. Date: Jan. 8, 2009

(65) Prior Publication Data
US 2010/0205308 A1    Aug. 12, 2010

(30) Foreign Application Priority Data

Jul. 4, 2007  (KR) .................. 10-2007-0067208

(51) Int. Cl.
*G06F 15/16* (2006.01)
*G06F 15/173* (2006.01)
*H04W 36/00* (2009.01)

(52) U.S. Cl. ........ 709/228; 709/232; 709/242; 709/246; 455/436

(58) Field of Classification Search .................. 709/225, 709/227, 228, 232, 242, 246; 455/436
See application file for complete search history.

(56) References Cited

U.S. PATENT DOCUMENTS

| 6,477,373 | B1 * | 11/2002 | Rappaport et al. ............ 455/436 |
| 6,704,571 | B1 * | 3/2004 | Moon ........................... 455/436 |
| 6,987,985 | B2 * | 1/2006 | Purkayastha et al. ...... 455/552.1 |
| 7,574,212 | B2 * | 8/2009 | McConnell et al. .......... 455/437 |
| 7,697,480 | B2 * | 4/2010 | Marin et al. .................. 370/331 |
| 7,710,950 | B2 * | 5/2010 | Buckley et al. ............... 370/354 |
| 7,711,381 | B2 * | 5/2010 | Sung et al. .................... 455/518 |
| 7,751,415 | B2 * | 7/2010 | Bos et al. ...................... 370/410 |
| 7,856,226 | B2 * | 12/2010 | Wong et al. ................. 455/414.1 |
| 7,912,070 | B1 * | 3/2011 | Choksi ..................... 370/395.52 |
| 7,965,704 | B2 * | 6/2011 | Lim et al. ..................... 370/354 |
| 8,023,497 | B2 * | 9/2011 | Jayaram et al. .............. 370/352 |
| 2006/0183478 | A1 * | 8/2006 | Jagadeesan et al. .......... 455/436 |

(Continued)

OTHER PUBLICATIONS

Gourraud, Christophe; Using IMS as a Service Framework; Mar. 2007; Swisscom AG; IEEE Vehicular Technology Magazine; p. 5 col. 1.*

(Continued)

*Primary Examiner* — John Follansbee
*Assistant Examiner* — Madhu Woolcock
(74) *Attorney, Agent, or Firm* — Birch, Stewart, Kolasch & Birch, LLP

(57) ABSTRACT

A session mobility support is disclosed. An application server (AS) can accurately recognize a session update by checking a Replace header, a user ID and a media element included in a session invitation message (or an SIP-based INVITE message) received from a UE (User Equipment), to thus guarantee successful mobility of a session. In addition, in order to allow the AS to accurately recognize the session update, the UE first transmits the session invitation message including the Replace header via a PS (Packet Switching domain, and then, after a response to the session invitation message is received, the UE transmits a call setup message (e.g., SETUP message) via a CS (Circuit Switching) domain.

9 Claims, 5 Drawing Sheets

U.S. PATENT DOCUMENTS

| | | | |
|---|---|---|---|
| 2007/0136459 A1* | 6/2007 | Roche et al. | 709/224 |
| 2007/0165655 A1* | 7/2007 | Haumont | 370/401 |
| 2007/0195754 A1* | 8/2007 | Shaheen | 370/352 |
| 2007/0280162 A1* | 12/2007 | Deshpande et al. | 370/331 |
| 2008/0032695 A1* | 2/2008 | Zhu et al. | 455/442 |
| 2008/0037515 A1* | 2/2008 | Sander | 370/352 |
| 2008/0165764 A1* | 7/2008 | Mutikainen et al. | 370/352 |
| 2009/0280810 A1* | 11/2009 | Mahdi et al. | 455/436 |

OTHER PUBLICATIONS

Yuh-Shyan Chen et al., "SmSCTP: SIP-Based MSCTP Scheme for Session Mobility over WLAN/3G Heterogeneous Networks" Wireless Communications and Networking Conference, 2007 WCNC 2007, IEEE, Mar. 11-15, 2007, pp. 3307-3312.

Vinod Cherian Joseph et al., "SIP as an enabler for Convergence in Future Wireless Communication Networks", Wireless and Optical Communications Networks, 2006 IFIP International Conference on, Apr. 11-13, 2006, pp. 1-5.

Mehdi Mani, "Session Mobility Between Heterogenous Accesses With the Exictence of IMS as the Service Contrl Overlay", Communications systems, 2006. ICCS 2006. 10th IEEE Singapore International Conference on, Oct. 2006, pp. 1-6.

\* cited by examiner

```
INVITE sip:UE-b@phone.example.org
To: <sip: domain.xfer@dtf1.home1.net>          ── 52
From: <sip:UE-a@example.org >;tag=8983
Call-ID: 01112345@example.org
CSeq: 1 INVITE
Contact: <sip: UE-a@phone.example.org >
Replaces: 0191234567@phone.example.org        ── 51
;to-tag=8983;from-tag=7743
Content-Type: application/sdp
Content-Length: (...)
v=0
o=- 2987933615 2987933615 IN IP6 5555::aaa:bbb:ccc:ddd
c=IN IP6 5555::aaa:bbb:ccc:ddd
m=video 49232 RTP/AVP 107                     ── 53
m=audio 37827 RTP/AVP 109...
```

METHOD FOR SUPPORTING SESSION MOBILITY

TECHNICAL FIELD

The present invention relates to a method for supporting a session mobility.

BACKGROUND ART

Recently, terminals that can be connected to two or more different networks have been introduced. For example, terminals that can be connected to a first network such as the IEEE 802.11 or IEEE 802.16 and a second network such as CDMA, GSM, GPRS, TDMA, WCDMA or UTRAN/GERAN have been presented.

However, in spite of the launch of such terminals, technology regarding handover performed between two or more different networks, and seamless handover or handover independent from media is yet to be complete.

In particular, if the terminal, which is currently performing a session including voice and non-voice data via a first network, i.e., a WLAN, moves to an area where a second network, i.e., the UTRAN/GERAN, is available, in order to allow the terminal to continuously perform the session, the voice data in the ongoing session should be moved to a CS (Circuit Switching) domain of the UTRAN/GERAN and non-voice data in the ongoing session should be moved to a PS (Packet Switching) domain of the UTRAN/GERAN. However, an application server (AS), which handles a mobility of the session, cannot know whether the terminal wants to move both the voice and non-voice data of the session to the UTRAN/GERAN or whether it wants to move only the voice to the UTRAN/GERAN, so successful mobility of the session cannot be guaranteed. This will be described in detail with reference to FIG. 1.

FIG. 1 is a flow chart showing a method for supporting a session mobility according to the related art.

1) A UE#a 11 is performing a session including voice data and non-voice data with a UE#b 12 via the first network (original network), e.g., the WLAN (S11).

2) The UE#a 11 moves to an area where the second network (target network), e.g., the UTRAN/GERAN is available to be used (S12). In this case, the second network, e.g., the UTRAN/GERAN, includes a CS domain and a PS domain, the UE#a 11 can be connected to the both domains. Thus, it is determined that, when the UE#a 11 moves to the second network, e.g., the UTRAN/GERAN, the voice with the UE#b 12 is performed through the CS domain while the non-voice data is performed through the PS domain.

3) In order to move the non-voice data in the session in the WLAN, the UE#a 11 transmits an INVITE message to the AS (S13). Here, the INVITE message includes a Replace header. The Replace header is used to move the session in the established WLAN to the UTRAN/GERAN.

4) Upon receiving the message, the AS transmits re-INVITE to the UE#b 12 so that the UE#b 12 can update the session with respect to the non-voice data (S14).

5) Meanwhile, the UE#a 11 transmits a CS SETUP message to an MGCF through the CS domain of the UTRAN/GERAN in order to move the voice in the session in the WLAN (S15).

6) The MGCF transmits an INVITE message to the AS in response to the reception of the CS SETUP message (S16). In this case, the MGCF does not have capability of including a Replace header to the INVITE message.

7) Upon receiving the INVITE message, the AS transmits a re-INVITE message to the UE#b 12 so that the UE#a and the UE#b12 can update session with respect to the voice (S17).

Therefore, although the UE#a 11 includes the Replace header in the INVITE message and transmits the same, the Replace header indicates only the fact that the session in the established WLAN is moved to the UTRAN/GERAN without including information as to whether both the voice and non-voice data of the session should be moved or as to whether only the voice data of the session should be moved, so the AS cannot guarantee successful mobility of the session.

In detail, although the AS has received the INVITE message including the Replace header but an INVITE message by the MGCF is not received, the AS cannot recognize whether the INVITE message by the MGCF is delayed due to a bad condition of the network or whether the UE#a 11 has not transmitted it. In this case, there is high possibility that the AS misrecognizes that the UE#a 11 intends to move only the non-voice data, so the successful mobility of the session cannot be guaranteed.

In addition, although the UE#a 11 has transmitted the INVITE message including the Replace header, if the INVITE message including the Replace header arrives later than the INVITE message transmitted by the MGCF, the AS cannot recognize whether the INVITE message by the MGCF is for generating a new session or whether it is to move the established session, so a successful mobility of the session cannot be guaranteed.

Meanwhile, whenever the AS receives one of the two INVITE messages, it transmits the re-INVITE message to the UE#b 12. In this case, if the voice and non-voice data are to be moved to the UTRAN/GERAN, it would be better to transmit the re-INVITE message at a time to save network resources.

DISCLOSURE OF INVENTION

Technical Solution

Therefore, in order to address the above matters, the various features described herein have been conceived. One aspect of the exemplary embodiments is to support successful mobility of a session by allowing an application server (AS) to recognize a type of a session update.

Another aspect of the present invention is to save network resources by allowing an AS to transmit a message only one time.

In order to achieve the above objects, the AS checks a Replace header, a user ID and a media element included in an INVITE message in order to recognize a type of a session update.

Also, in order to achieve above objects, a UE#a first transmits an INVITE message including a Replace header, and does not transmit a SETUP message until it receives a response with respect to the INVITE message.

This specification provides a method for supporting a session mobility of a terminal that moves from a first communication network to a second communication network, including: receiving a session invitation message, by a server, from the terminal; analyzing, by the server, information about a media element included in the session invitation message to determine a type of a session update; and transmitting a session invitation message to a counterpart entity of the terminal to allow updating a session between the terminal and the counterpart entity.

This specification also provides a method for supporting a session mobility of a terminal that moves from a first communication network to a second communication network, including: receiving a session invitation message, by a server, from the terminal; analyzing, by the server, information about a media element included in the session invitation message to determine the type of a session update; waiting for a certain time if the type of the session update is determined to be a combined session update; and transmitting the session invitation message to a counterpart entity of the terminal to allow updating of a session between the terminal and the counterpart entity, when an additional session invitation message is received with the certain time.

This specification also provides a method for supporting a session mobility of a terminal that moves from a first communication network to a second communication network, including: transmitting, by the terminal, a session invitation message to a server; receiving, by the terminal, a response message with respect to the session invitation message from the server; transmitting, by the terminal, a call setup message in response to the reception of the response message; and updating a session with a counterpart entity and transmitting one or more of voice and non-voice data via the second communication network, when the terminal receives an approval message from the server.

In the present invention, because the AS can recognize updating of a session, successful mobility of the session can be supported. In addition, because the AS transmits a message only one time, network resources can be saved.

The foregoing and other objects, features, aspects and advantages of the present invention will become more apparent from the following detailed description of the present invention when taken in conjunction with the accompanying drawings.

MODE FOR THE INVENTION

Figure 1:
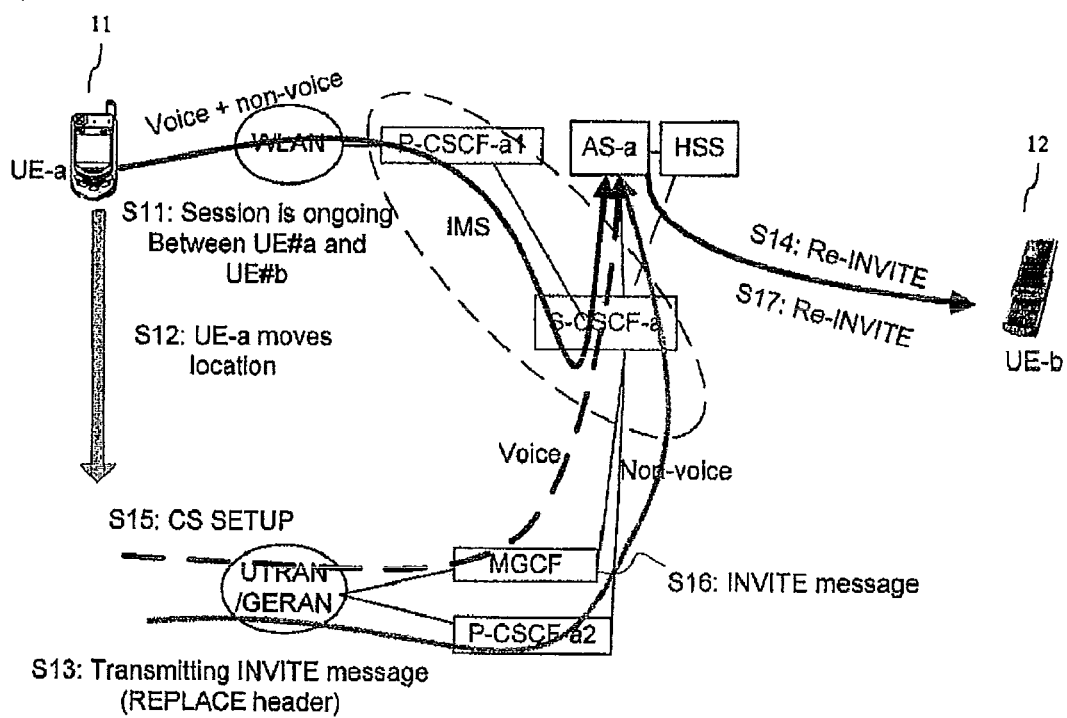
FIG. 1 is a flow chart of a method for supporting a session mobility according to the related art.

A UE (User Equipment) is exemplarily shown in the accompanying drawings but it can be mentioned in the term such as a terminal, an ME (Mobile Equipment), and the like. In addition, the UE may be a portable device such as a notebook computer, a mobile phone, a PDA, a smart phone, a multimedia player, or the like, or may be a device that cannot be portable such as a PC or a vehicle-mounted device.

Before description of the present invention with reference to the accompanying drawings, the techniques and terms used in the specification of the present invention will be described to help understanding of the present invention.

(1) Types of Session Updates

1) Combined session update: This means that when a UE#a, which has transmitted/received voice data and non-voice data to/from a UE#b via an original network, moves to a target network, the UE#a transmits/receives the voice data and the non-voice data in the same manner in the target network.

For the combined session update, there can be three cases as follows.

A first case is that when the UE#a, which has transmitted voice data and non-voice data in a single session via a PS (Packet Switching) domain of the original network (a first network) such as a WLAN, moves to an area where the target network (a second network), such as a mobile communication network (e.g., UTRAN/GERAN)) is available, the single session is divided into a CS (Circuit Switching)-based session for the voice data and a PS-based session for the non-voice data and performed. This is called PS to CS+PS update. In this first case, in order to update the single session, the UE#a should transmit a call set-up message (or a call origination message) (e.g., a SETUP message) via the CS domain of the UTRAN/GERAN and transmit a session invitation message (or a session initiation request message) (e.g., an SIP-based INVITE message) via the PS domain of the UTRAN/GERAN. Thus, an application server (referred to as 'AS', hereinafter) does not transmit the session invitation message to the UE#b to update the session until it receives the two messages transmitted via both the PS and CS domains. Thus, when the AS receives one message only via one domain, it waits to receive another message via another domain. In this case, the AS may operate a timer (not shown). If the AS does not receive another message via another domain even after the timer expires, the AS transmits the session invitation message to the UE#b based on only the already received message.

A second case is that when the UE#a, which has transmitted voice data and non-voice data in a single session via the PS domain such as the original network, e.g., the WLAN, moves to an area where the target network, such as the mobile communication network (e.g., the UTRAN/GERAN) is available (or when the UE#a, which has transmitted the voice data and the non-voice data in a single session via the PS of the UTRAN/GERAN, moves to the WLAN), the UE#a transmits the voice data and the non-voice data in the single session via the PS domain in the same manner. This is called PS to PS update. In this second case, in order to update the session, the UE#a transmits a session initiation message (or a session initiation request message) (e.g., an SIP-based INVITE message) via only the PS domain of the target network. Thus, when the AS receives the session invitation message, it immediately transmits the session invitation message to the UE#b.

A third case is a situation that is opposite to the first case. Namely, when UE#a performs at least two sessions (namely, the CS domain-based session for the voice data and the PS domain-based session for the non-voice data) via the original network, e.g., the UTRAN/GERAN, and if the UE#a tries to move to an area where the PS domain of the target network such as the WLAN is available, the two sessions are combined into a single session and proceeds in the target network. This is called CS+PS to PS. In this third case, in order to update the session, the UE#a transmits a single session invitation message (or session initiation request message) (e.g., an SIP-based INVITE message) via the target network. Accordingly, when the AS receives the session initiation message, it immediately transmits the session invitation message to the UE#b.

2) Split session update: This means that when the UE#a, which has transmitted the voice data and the non-voice data via the original network, moves to the target network, the UE#a transmits one of the voice data and the non-voice data via the target network and the other still via the original network as it is.

In this case, when the AS receives a session invitation message through any one of the PS domain and the CS domain, it immediately transmits the session invitation message to the UE#b.

3) Split session update with dropping: This means that when the UE#a, which has transmitted the voice data and non-voice data via the original network, moves to the target network, transmission of one of the voice data and the non-voice data is not supported by the target network, so the transmission of one data is stopped and only transmission of the other data is performed via the target network.

In the same manner as described above, when the AS receives a session invitation message through any one of the PS domain and the CS domain, it immediately transmits the session invitation message to the UE#b.

The exemplary embodiments of the present invention will now be described in detail with reference to the accompanying drawings.

Figure 2:
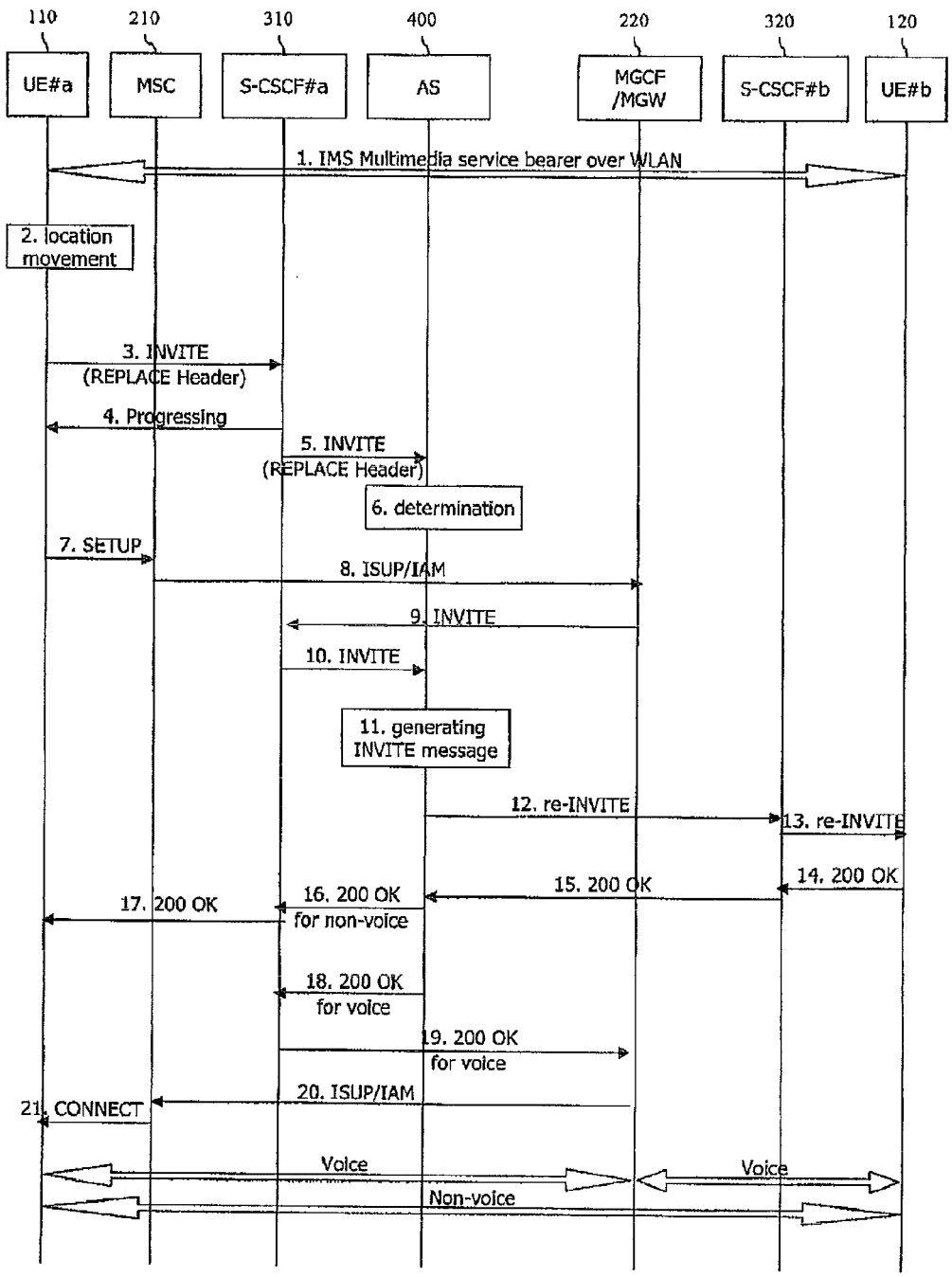
FIG. 2 is one exemplary flow chart showing a session mobility supporting method according to an embodiment of the present invention.
Figures 4, 5:
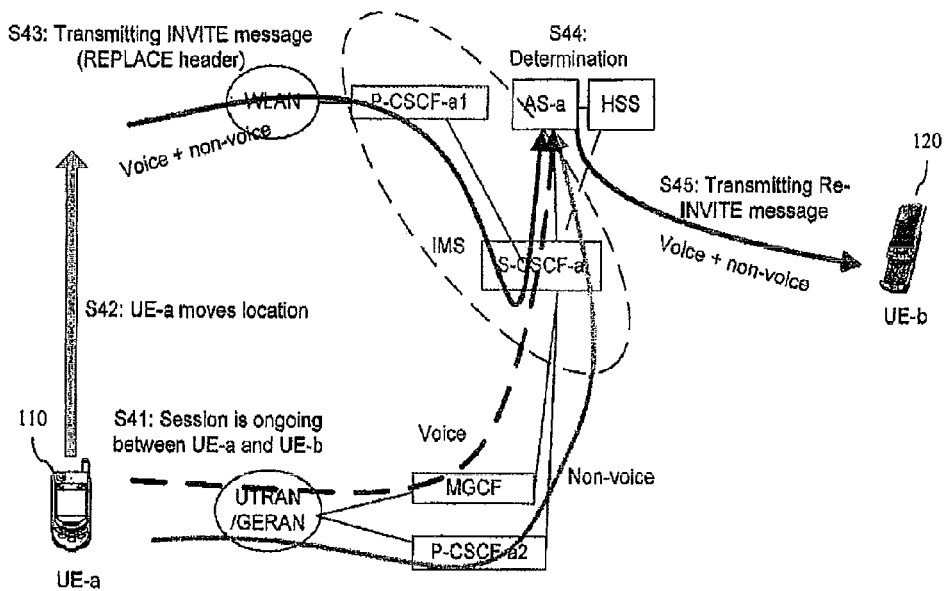
FIG. 4 is still another exemplary flow chart showing a session mobility supporting method according to an embodiment of the present invention.
FIG. 5 is an exemplary view showing a session invitation message.

FIG. 2 is one exemplary flow chart showing a session mobility supporting method according to an embodiment of the present invention, and FIG. 5 is an exemplary view showing a session invitation message.

FIG. 2 relates to the PS to CS+PS among the above-mentioned combined session update, which is characterized in that the UE#a 110 should necessarily first transmit the INVITE message, and the AS 400 determines the type of a session update based on a Replace header, a public user ID and a media element included in the INVITE message received from the UE#a 110. This will now be described in detail with reference to FIGS. 2 and 5.

1) UE#a 110 performs a session, in which voice data and non-voice data are combined, with a UE#b 120 via the first network (original network), e.g., the WLAN.

2) The UE#a 110 moves to an area where the second network (target network), e.g., the UTRAN/GERAN is available to be used. In this case, it is assumed that the UTRAN/GERAN includes the CS domain and the PS domain and the UE#a 110 can be connected to the both domains. Then, the UE#a 110 determines to move the voice data in the session into the CS domain of the UTRAN/GERAN network and move the non-voice data in the session into the PS domain of the UTRAN/GERAN network. According to this determination, the UE#a 110 generates a session initiation message (or a session initiation request message) (e.g., an SIP-based INVITE message) for the non-voice data. In this case, the session initiation message includes the Replace header (51 in FIG. 5), an IMPU (IMS Public User Identity) (52 in FIG. 5), and information about a media element (53 in FIG. 5). Meanwhile, the UE#a 110 generates a call setup message (or a call origination message) (e.g., a SETUP message) for the voice data.

3) The UE#a 110 transmits the session invitation message having the Replace header via the PS domain of the UTRAN/GERAN (target network). In this case, the reason of first transmitting the session initiation message before the call setup message is because, the call setup message cannot include the Replace header, so if the AS 400 first receives the call setup message, it cannot recognize whether it is to update an established session or whether a new session has been added.

4) An S-CSCF#a (Serving-Call Session Control Function) 310 receives the session invitation message having the Replace header, and transmits an acknowledgement message, e.g., a progressing message, to the UE#a 110.

5) Subsequently, the S-CSCF#a 310 transmits the session initiation message having the Replace header to the AS 400.

6) Upon receiving the session initiation message, the AS 400 determines the type of the session update.

In detail, in order to determine the type of the session update, the AS 400 checks whether or not the session initiation message includes the Replace header (51 in FIG. 5). If the Replace header is included in the session initiation message, the AS 400 checks whether an IMPU (IMS Public User Identity) (52 in FIG. 5) included in the session invitation message is the same as an IMPU included in a previously received message. If the IMPUs are the same, the AS 400 checks whether or not a media element (53 in FIG. 5) included in the session invitation message is the same as that proceeding via the original network, i.e., the WLAN. If the media element proceeding via the WLAN includes voice and non-voice data and if media elements included in the two session invitation message received from the CS and PS domains include the same voice and non-voice data, the AS 400 determines that the session update corresponds to PS to CS+PS among the combined session update. If voice can be performed according to a VoIP (Voice over Internet Protocol) in the target network and a media element included in an invitation message received via the PS domain includes voice data and non-voice data in the same manner, the AS 400 determines that the session update corresponds to PS to PS. If, however, a media element proceeding via the WLAN includes voice data and non-voice data while a media element included in the session invitation message includes only voice data, the AS 400 determines the session update corresponds to the split session update. In FIG. 2, it is assumed that the AS 400 determines that the session update corresponds to PS to CS+PS.

As the AS 400 determines that the session update corresponds to PS to CS+PS, it waits until a different session invitation message (INVITE message via the CS domain) is additionally received. In this case, the AS 400 operates a timer (not shown) and waits for a certain time, but if the INVITE message is not received until then (i.e., until the certain time lapses), the AS 400 may re-determine that the session update corresponds to the split session update.

7) When the UE#a 110 receives the acknowledgement message, e.g., the progressing message, the UE#a 110 transmits the call setup message (or the call origination message, e.g., SETUP message) to an MSC 210 of the CS domain for the voice data in the session from the WLAN.

8) Then, in response to the reception of the call setup message (SETUP), the MSC 210 transmits an ISUP/IAM message to an MGCF/MGW 220 (or the MSC converts the call setup message into an ISUP/IAM message and transmits the same).

9)~10) The MGCF/MGW 220 converts the ISUP/IAM message into a session invitation message (or a session initiation request message) (e.g., an SIP-based INVITE message) and transmits the same to the AS 400 via the S-CSCF#a 310 (S55). In this case, a header or body of the session invitation message includes a value that URI is VDN (R-URI=VDN).

11) Upon receiving the session invitation message (INVITE message) with respect to the voice data, the AS 400 generates a session invitation message (Re-INVITE message) based on the previously received session invitation message for the non-voice data and the session invitation message with respect to the voice. In this case, the AS determines the type of a session mobility (or session continuity) based on the media, the IMPU, or the like included in the invitation message with respect to the voice and non-voice data, and generates the session invitation message (Re-INVITE message) accordingly.

12) The AS 400 transmits the generated session invitation message to a S-CSCF#B 320 that handles the UE#b 120.

13) The S-CSCF#b 320 transmits the session invitation message (Re-INVITE) to the UE#b 120.

14)~15) In response to the reception of the session invitation message, the UE#b 120 transmits a positive response message, e.g., an SIP-based 200 OK message, to the AS 400 via the S-CSCF#b 320.

16)~17) Then, the AS transmits a positive response message, e.g., an SIP-based 200 OK message, to the UE#a 110 via the S-CSCF#a 310, as a response to the session invitation message with respect to the non-voice data from the UE#a 110.

18)~19) And then, the AS 400 transmits a positive response message, e.g., an SIP-based 200 OK message, to the MGCF/MGW 220 via the S-CSCF#a 310, as a response to the session invitation message with respect to the voice data from the UE#a 110.

20)~21) In response to the reception of the positive response message, the MGCF/MGW 220 transfers the ISUP/IAM message to the MSC 210. Then, the MSC 210 transmits a CONNECT message to the UE#a 110.

The UE#a 110 updates the session with the UE#b 120 and may perform a voice session with the UE#b 120 via the CS domain of the UTRAN/GERAN and a non-voice session with the UE#b 120 via the PS domain of the UTRAN/GERAN.

Figure 3:
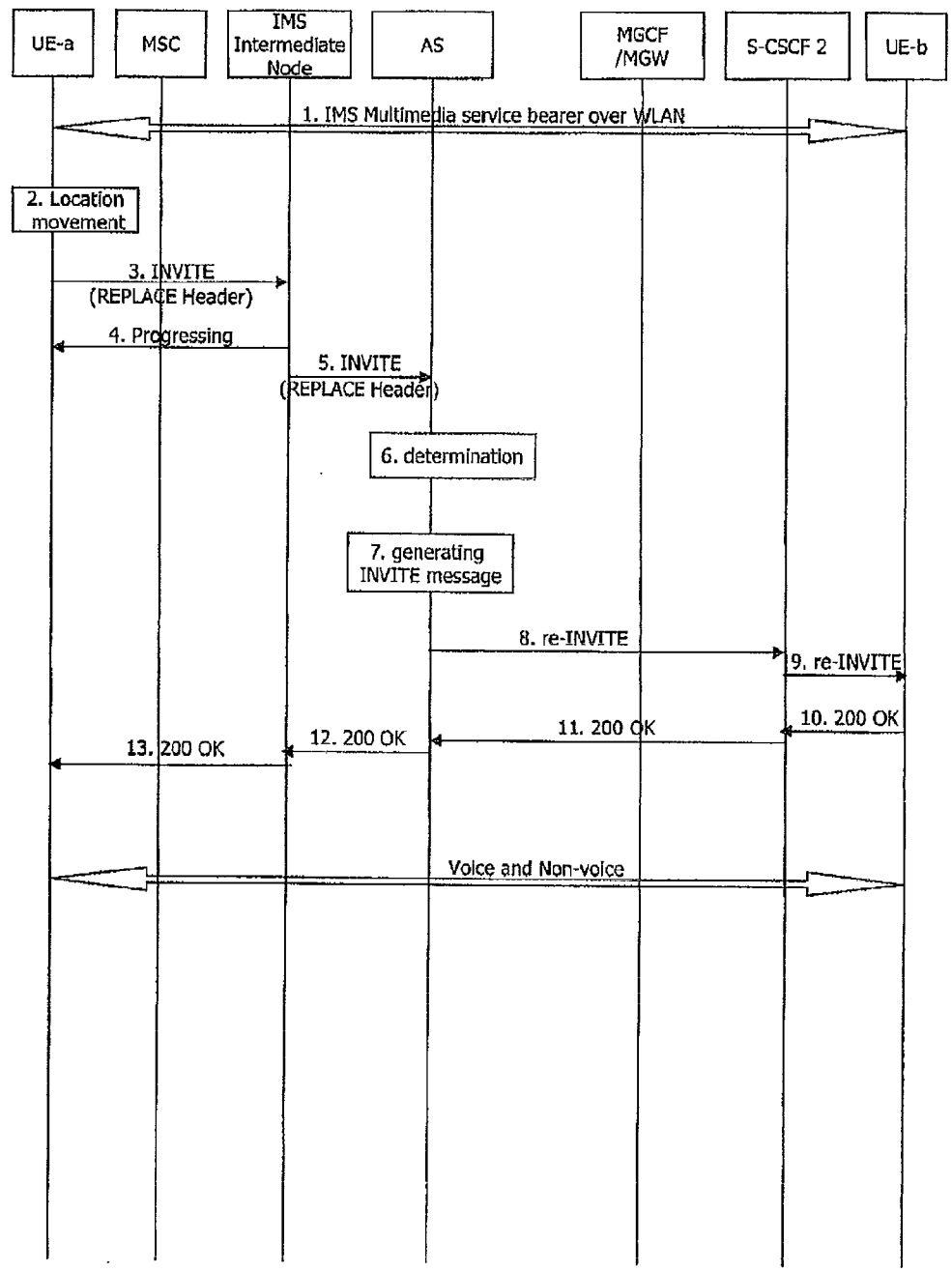
FIG. 3 is another exemplary flow chart showing a session mobility supporting method according to an embodiment of the present invention.

FIG. 3 is another exemplary flow chart showing a session mobility supporting method according to an embodiment of the present invention. Specifically, FIG. 3 shows the PS to PS among the combined session update. The PS to PS will now be described with reference to FIG. 3.

1) The UE#a 110 performs a session, in which voice data and non-voice data are combined, with the UE#b 120 via the first network (original network, e.g., the WLAN).

2) The UE#a 110 moves to an area where the second network (target network, e.g., the UTRAN/GERAN) is available to be used. In this case, it is assumed that the UTRAN/GERAN includes the CS domain and the PS domain, and the PS domain supports the VoIP. Then, the UE#a 110 determines to move the voice and non-voice data in the session to the PS domain of the UTRAN/GERAN. According to the determination, the UE#a 110 generates a session invitation message (or a session initiation request message, e.g., an SIP-based INVITE message). In this case, the session invitation message may be, for example, the same as that shown in FIG. 5. Namely, the session invitation message includes the Replace header (51 in FIG. 5), the IMPU (IMS Public User Identity) (52 in FIG. 5), and the information about the media element (53 in FIG. 5).

3) The UE#a 110 transmits the session invitation message including the Replace header via the PS domain of the UTRAN/GERAN (target network).

4) The S-CSCF#a 310 receives the session invitation message having the Replace header and transmits an acknowledgement message, e.g., a progressing message, to the UE#a 110.

5) Subsequently, the S-CSCF#a 310 transmits the session invitation message having the Replace header to the AS 400.

6) Upon receiving the session invitation message, the AS 400 determines the type of a session update. In this case, as described above, the AS 400 checks whether the Replace header exists in the session invitation message (INVITE message), whether the IMPU is the same, and whether the media element is the same. If the media element proceeding via the WLAN includes voice and non-voice data, if the media element included in the session invitation message includes the same voice and non-voice data, and if the voice can be performed according to the VoIP, then the AS server 400 determines that the session update is PS to PS.

7) The AS generates a session invitation message (INVITE message) based on the session invitation message.

8)~9) The AS 400 transmits the session invitation message to the UE#b120 via the S-CSCF#b 320 that handles the UE#b 120.

10)~13) In response to the reception of the session invitation message, the UE#b 120 transmits a positive response message, e.g., an SIP-based 200 OK message.

Then, the UE#a 110 updates the session with the UE#b 120 and may perform a session including the voice and non-voice data with the UE#b 120 via the PS domain of the UTRAN/GERAN.

FIG. 4 is still another exemplary flow chart showing a session mobility supporting method according to an embodiment of the present invention. Specifically, FIG. 4 relates to CS+PS to PS among the combined session updates, in which the original network is, for example, the UTRAN/GERAN and the target network is the WLAN. The CS+PS to PS update will now be described in detail with reference to FIG. 4.

1) The UE#a 110 performs a voice session with the UE#b 120 via the CS domain of the original network, e.g., the UTRAN/GERAN, and performs a non-voice data session with the UE#b 120 via the PS domain of the UTRAN/GERAN (S41).

2) The UE#a 110 moves to an area where a target network, e.g., the WLAN, is available to be used (S42). Then, the UE#a 110 determines to combine the session for the voice data and the session for the non-voice data and move the combined one to the WLAN. According to such determination, the UE#a 110 generates a session invitation message (or a session initiation request message, e.g., an SIP-based INVITE message). In this case, the session invitation message includes the Replace header (51 in FIG. 5), an IMPU (IMS Public User Identity) (52 in FIG. 5), and information about the media element (53 in FIG. 5).

3) Then, the UE#a 110 transmits the session invitation message (INVITE message) to the AS 400 via the target network WLAN (S43).

4) Upon receiving the session invitation message, the AS 400 determines the type of the session update.

In this case, as stated above, the AS 400 checks whether the Replace header exists in the session invitation message (INVITE message), whether the IMPU is the same, and whether the media element is the same, and determines that the session update is CS+PS to PS among the combined session updates.

5) The AS 400 generates a session invitation message (INVITE message) based on the determination result and the session invitation message, and transmits the generated session invitation message to the UE#b 120 (S45).

Finally, although not shown, when the UE#b 120 receives the session invitation message, it transmits a response message. Then, the UE#a 110 updates the session with the UE#b 120 and performs the updated session including the voice data and the non-voice data with the UE#b 120.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

Figure 6:
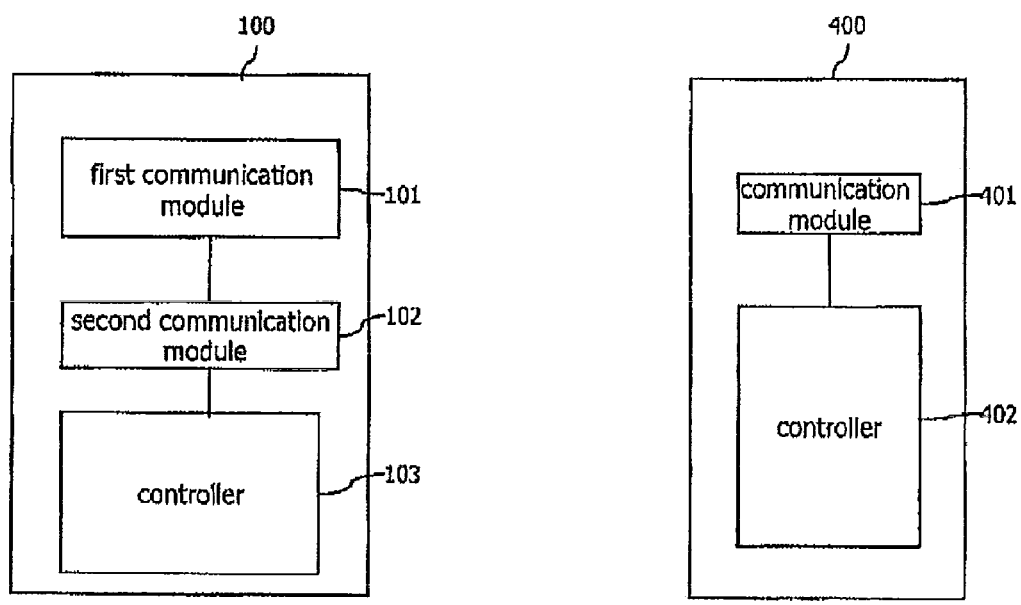
FIG. 6 is an exemplary block diagram of a UE and an application server according to an embodiment of the present invention.

FIG. 6 is an exemplary block diagram of the UE and the AS according to an embodiment of the present invention.

A UE 100 according to the embodiment of the present invention as shown in FIG. 6 has the same configuration as those of the UE#a 110 and the UE#b 120 as shown in FIGS. 2 to 5. In describing the UE 100 and an AS 500, the repeated explanation will be omitted and follow those as described above with reference to FIGS. 2 to 5.

The UE 100 may include a first communication module 101, a second communication module 102, and a controller 103.

The first communication module 101 may include electronic components that can be connected to the first network, e.g., a network of IEEE 802.11 (or called WLAN) or a network of IEEE 802.16.

The second communication module 102 may include electronic components that can be connected to the second network, e.g., a network such as CDMA, GSM, GPRS, TDMA, IMT-2000, WCDMA, HSDPA, or UTRAN/GERAN.

The controller 103 controls the first and second communication modules 101 and 102. In detail, when the UE 100 moves from the first network (original network) to an area where it can use the second network (target network), it checks a radio environment with respect to the second network and determines the type of a session update. According to such determination, the UE 100 generates a session invitation message (or a session initiation request message, e.g., an SIP-based INVITE message) as shown in FIG. 5 and the controller 103 transmits the session invitation message to the AS 400 via the second network. When a response message with respect to the session invitation message is received, the controller 103 transmits a call setup message (SETUP message).

The first and second communication modules, the controller 103 and other matters may be easily implemented by a skilled person in the art to which the present invention pertains with reference to this specification, so a detailed description therefor will be omitted.

The AS 400 includes a communication module 401 and a controller 402.

The communication module 401 may receive a session invitation message from the UE 100 as shown in FIGS. 2 to 5.

The controller 402 checks whether a Replace header exists in the received session invitation message. If the Replace header is included in the message, the controller 402 checks whether an IMPU (IMS Public User Identity) included in the session invitation message is the same as an IMPU included in a previously received message. If the IMPUs are the same, the controller 402 checks whether the media element (53 in FIG. 5) included in the session invitation message is the same as that currently proceeding via the original network, namely, the WLAN. Through such checking, the controller 402 determines the type of a session update.

The communication module 401, the controller 402, and other matters may be easily implemented by a skilled person in the art to which the present invention pertains with reference to this specification, so a detailed description therefor will be omitted.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for supporting a session mobility of a terminal that moves from a first communication network to a second communication network, the method comprising:
   receiving a session invitation message, by a server, from the terminal;
   analyzing, by the server, information about a media element included in the session invitation message to determine a type of a session update; and
   transmitting, by the server, a re-invite message to a counterpart entity of the terminal to allow updating a session between the terminal and the counterpart entity,
   wherein the analyzing of the information about the media element comprises:
   checking, by the server, whether a Replace header is included in the session invitation message;
   if the Replace header is included in the session invitation message, checking, by the server, whether an IMPU (IMS Public User Identity) included in the session invitation message is the same as an IMPU included in a previously received session invitation message of the session;
   if the IMPUs included in the session invitation message and the previously received session invitation message are the same, checking, by the server, whether the information about the media element included in the session invitation message and information about a media element included in the previously received session invitation message are the same,
   wherein the information about the media element included in each of the session invitation message and the previously received session invitation message indicates a voice media, a non-voice media, or a voice and non-voice media,
   if the information about the media element included in the session invitation message and the previously received session invitation message are the same and indicate the voice and non-voice media, determining, by the server, the type of the session update as a combined session update; and
   if the information about the media element included in the session invitation message indicates one of the voice media or the non-voice media, and if the information about the media element included in the previously received session invitation message indicates the voice and non-voice media, determining, by the server, the type of the session update as a split session update,
   wherein the combined session update is defined as the session including both of the voice media and the non-voice media are maintained in the second communication network, and
   wherein the split session update is defined as the session including one of the voice media or the non-voice media are maintained in the second communication network.

2. The method of claim 1, wherein the type of session update further comprises a split session update having dropping.

3. The method of claim 1, wherein the determining, by the server, the type of the session update as the combined session update further includes:
   if the first and the second communication network are IEEE (Institute of Electrical and Electronics Engineers) 802 system network and 3GPP (3rd Generation Partnership Project) system network, respectively, determining, by the server, the type of the session update as PS (Packet Switched) to CS (Circuit Switched) +PS if a VoIP (Voice over Internet Protocol) is not supported by the second communication system, if the first and the second communication network are IEEE 802 system network and 3GPP system network, respectively, determining, by the server, the type of the session update as PS to PS if the VoIP is supported by the second communication system, and if the first and the second communication network are 3GPP system network and IEEE 802 system network, respectively, determining, by the server, the type of the session update as CS+PS to PS.

4. The method of claim 1, wherein the session invitation message is a SIP-based INVITE message.

5. A method for supporting a session mobility of a terminal that moves from a first communication network to a second communication network, the method comprising:

receiving a session invitation message, by a server, from the terminal;

analyzing, by the server, information about a media element included in the session invitation message to determine a type of a session update;

waiting, by the server, for a certain time if the type of the session update is determined to be a combined session update; and transmitting, by the server, a re-invite message to a counterpart entity of the terminal to allow updating of a session between the terminal and the counterpart entity, when an additional session invitation message is received within the certain time, wherein the analyzing of the information about the media element comprises:

checking, by the server, whether a Replace header is included in the session invitation message;

if the Replace header is included in the session invitation message, checking, by the server, whether an IMPU (IMS Public User Identity) included in the session invitation message is the same as an IMPU included in a previously received session invitation message of the session;

if the IMPUs included in the session invitation message and the previously received session invitation message are the same, checking, by the server, whether the information about the media element included in the session invitation message and information about a media element included in the previously received session invitation message are the same, wherein the information about the media element included in each of the session invitation message and the previously received session invitation message indicates a voice media, a non-voice media, or a voice and non-voice media;

if the information about the media element included in the session invitation message and the previously received session invitation message are the same and indicate the voice and non-voice media, determining, by the server, the type of the session update as the combined session update; and if the information about the media element included in the session invitation message indicates one of the voice media or the non-voice media, and if the information about the media element included in the previously received session invitation message indicates the voice and non-voice media, determining, by the server, the type of the session update as a split session update, wherein the combined session update is defined as the session including both of the voice media and the non-voice media are maintained in the second communication network, and wherein the split session update is defined as the session including one of the voice media or the non-voice media are maintained in the second communication network.

6. The method of claim 5, further comprising:

transmitting, by the server, a response message to the terminal, if the session invitation message is received from the terminal.

7. The method of claim 5, wherein the session invitation message is a SIP-based INVITE message.

8. The method of claim 5, further comprising:

re-determining, by the server, a type of the session update when an additional session invitation message is not received within the certain time.

9. A server configured to support a session mobility of a terminal that moves from a first communication network to a second communication network, the server comprising:

a processor device configured to receive a session invitation message from the terminal;

analyze information about a media element included in the session invitation message to determine a type of a session update; and transmit a re-invite message to a counterpart entity of the terminal to allow updating a session between the terminal and the counterpart entity, wherein the processor is configured to analyze the information about the media element by:

checking whether a Replace header is included in the session invitation message;

if the Replace header is included in the session invitation message, checking whether an IMPU (IMS Public User Identity) included in the session invitation message is the same as an IMPU included in a previously received session invitation message of the session;

if the IMPUs included in the session invitation message and the previously received session invitation message are the same, checking whether the information about the media element included in the session invitation message and information about a media element included in the previously received session invitation message are the same, wherein the information about the media element included in each of the session invitation message and the previously received session invitation message indicates a voice media, a non-voice media, or a voice and non-voice media;

the information about the media element included in the session invitation message and the previously received session invitation message are the same and indicate the voice and non-voice media, determining, by the server, the type of the session update as a combined session update; and if the information about the media element included in the session invitation message indicates one of the voice media or the non-voice media, and if the information about the media element included in the previously received session invitation message indicates the voice and non-voice media, determining, by the server, the type of the session update as a split session update,
wherein the combined session update is defined as the session including both of the voice media and the non-voice media are maintained in the second communication network, and
wherein the split session update is defined as the session including one of the voice media or the non-voice media are maintained in the second communication network.

* * * * *